(12) United States Patent
Matthews

(10) Patent No.: US 8,411,569 B2
(45) Date of Patent: Apr. 2, 2013

(54) METHOD OF SPLICING ENCODED MULTIMEDIA DATA STREAMS

(75) Inventor: Kim Matthews, Watchung, NJ (US)

(73) Assignee: Alcatel Lucent, Paris (FR)

( * ) Notice: Subject to any disclaimer, the term of this patent is extended or adjusted under 35 U.S.C. 154(b) by 1481 days.

(21) Appl. No.: 11/972,188

(22) Filed: Jan. 10, 2008

(65) Prior Publication Data

US 2009/0183197 A1   Jul. 16, 2009

(51) Int. Cl.
 *H04J 1/16* (2006.01)
(52) U.S. Cl. ........................................... 370/232
(58) Field of Classification Search .............. 375/240.26
 See application file for complete search history.

(56) References Cited

U.S. PATENT DOCUMENTS

| | | | |
|---|---|---|---|
| 7,139,241 B1 | 11/2006 | Gazit | 370/231 |
| 2002/0101368 A1* | 8/2002 | Choi et al. | 341/61 |
| 2003/0206558 A1* | 11/2003 | Parkkinen et al. | 370/477 |
| 2004/0186877 A1* | 9/2004 | Wang et al. | 709/200 |
| 2005/0190781 A1* | 9/2005 | Green et al. | 370/432 |
| 2006/0106961 A1* | 5/2006 | Ebata et al. | 710/52 |
| 2007/0140358 A1 | 6/2007 | Schwartz et al. | 375/240.26 |

FOREIGN PATENT DOCUMENTS

| | | |
|---|---|---|
| WO | WO 02/09425 A1 | 1/2002 |
| WO | WO 2004/019530 | 3/2004 |

OTHER PUBLICATIONS

International PCT Search Report PCT/US2009/030082 dated Oct. 22, 2009.
Mehdi Rezaei et al. "Spliced Video and Buffering Considerations for Tune-In Time Minimization in DVB-H for Mobile TV" Personal, Indoor and Mobile Radio Communications, 2006 IEEE 17th International Syposium on, IEEE, I< Sep. 1, 2006 pp. 1-5 XP031023391.
International PCT Search Report PCT/US2009/030082 dated Jun. 25, 2009.

\* cited by examiner

*Primary Examiner* — Hassan Kizou
*Assistant Examiner* — Ashil Farahmand
(74) *Attorney, Agent, or Firm* — Williams, Morgan & Amerson, P.C.

(57) ABSTRACT

The present invention provides a method of splicing data streams flowing between an encoder and a decoder. The method includes accessing a first encoded data stream. The first encoded data stream is encoded by the encoder based upon a first buffer size associated with the decoder. The method also includes delaying the first encoded data stream by an offset determined based on a second buffer size associated with the decoder. The second buffer size is larger than the first buffer size. The method further includes splicing one or more second encoded data stream(s) into the delayed first encoded data stream.

20 Claims, 12 Drawing Sheets

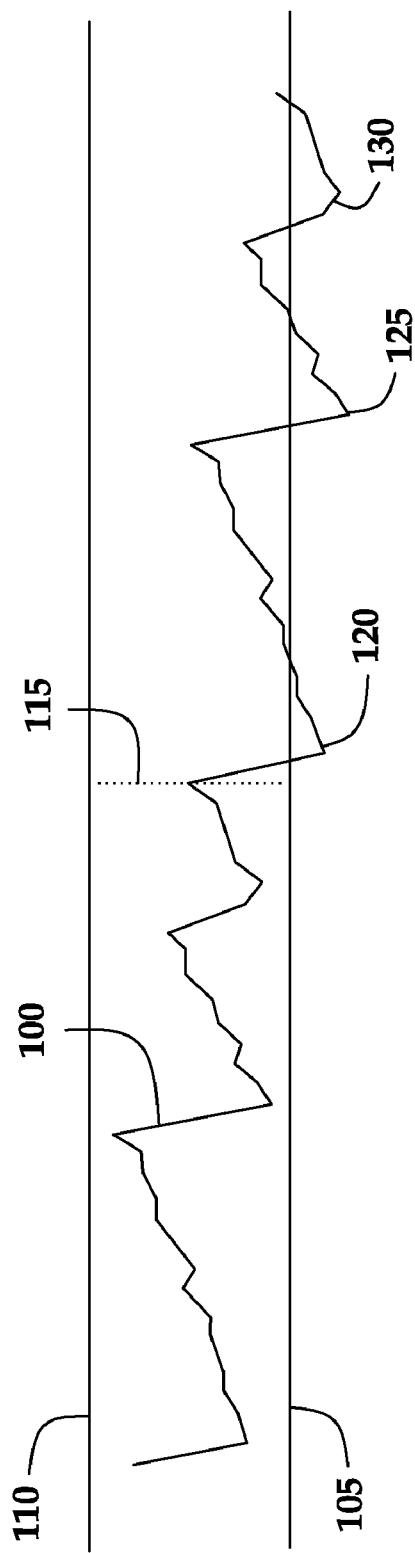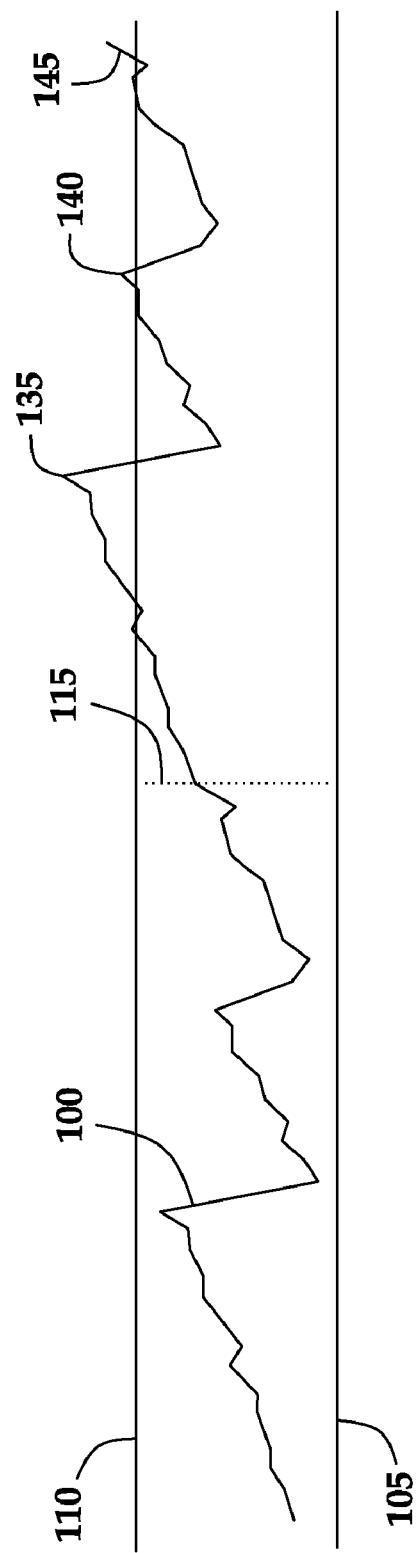

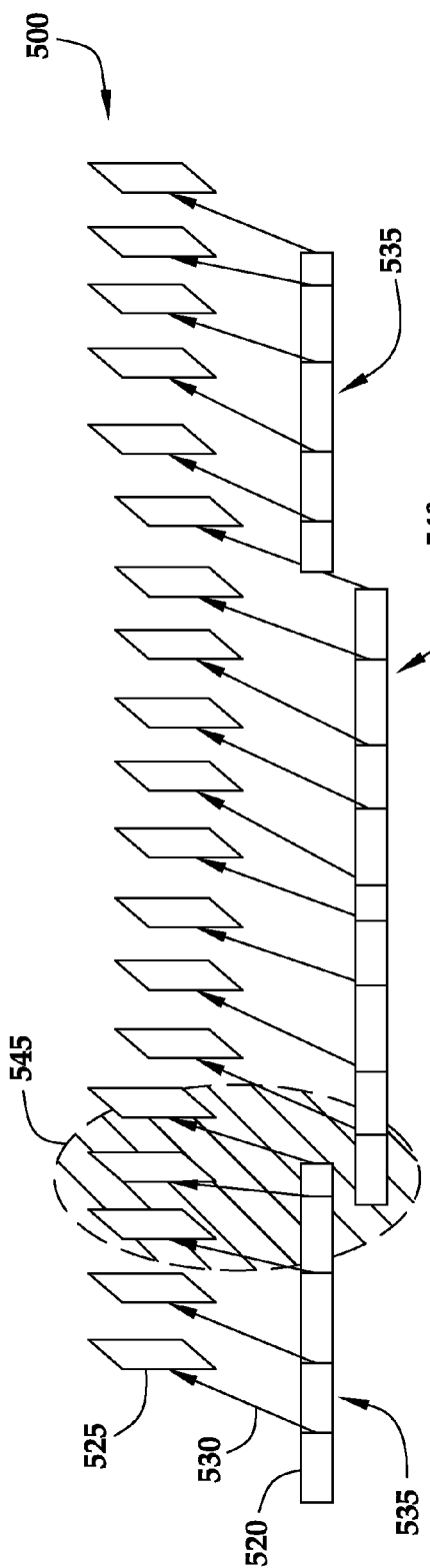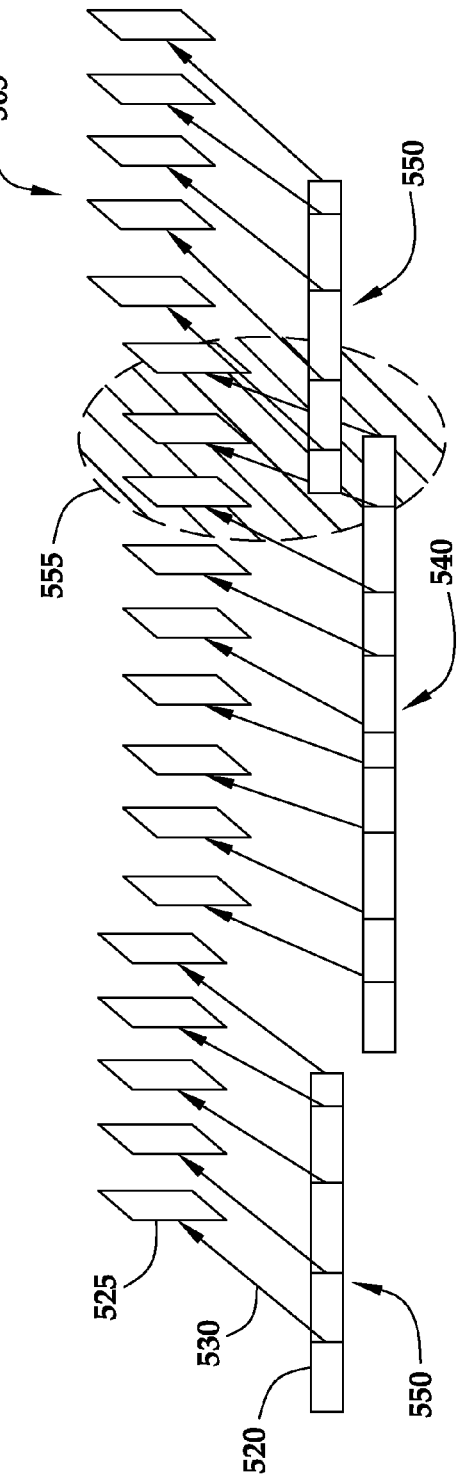

# METHOD OF SPLICING ENCODED MULTIMEDIA DATA STREAMS

BACKGROUND OF THE INVENTION

1. Field of the Invention

This invention relates generally to communication systems, and, more particularly, to transmission of multimedia data streams in communication systems.

2. Description of the Related Art

Digital multimedia has become a viable alternative to conventional analog transmission of video and/or audio data. For example, packet-based techniques such as Internet Protocol television (IPTV) may be used to provide digital multimedia services such as television, video-on-demand, and the like. In a typical digital multimedia broadcast system, a sequence of images is converted into a digital representation of the images. The digital data is then encoded and transmitted to a receiving unit, such as a television or a computer, which includes a buffer for storing the received information for several images before providing the encoded information to a decoder for decoding and eventual presentation of the image. The decoder buffer may overflow if the transmitter attempts to send too much digital data to the receiving unit, resulting in data loss and possible picture drop. Conversely, the decoder buffer may underflow if the transmitter does not send enough digital data to the receiving unit. Underflow may cause a decoder stall and the repetition of one or more images. Since overflow and underflow of the decoder buffer may degrade user experience, conventional digital multimedia systems vary the encoding quality of each image to affect bit rate to attempt to maintain the decoder buffer level within a selected range.

Service providers may want to splice together multiple data streams to broadcast additional information to users. For example, a service provider may want to splice encoded advertising information into encoded multimedia content that the service provider is broadcasting or multicasting to one or more users in an encoded data stream. One splicing technique is to decode the multimedia data stream and the advertising data stream. The decoded data streams may then be spliced together and then re-encoded for transmission to the receiving unit. This approach has the advantage that the information in the spliced data streams is encoded by a single encoder at a bit rate that is selected to maintain the decoder buffer level within the selected range. Buffer overflow and/or underflow may then be avoided by selecting an appropriate bit rate. However, this approach requires additional hardware and/or software to decode the multiple data streams. For example, a splicer may include one decoder for each data stream, a video switch for splicing the two decoded data streams, and an encoder for re-encoding the spliced data stream.

One alternative approach is to simply splice together the encoded data streams at a selected splice point. Although this approach requires less hardware and/or software than techniques that splice together decoded data streams, simply splicing together encoded data streams may lead to decoder buffer underflow and/or overflow. For example, the encoded data streams may have been separately encoded using different models of the decode buffer. The decode buffer models typically assume an initial decode buffer level that is transmitted periodically from the encoder to the decoder within the multimedia stream to allow decoders to adjust their decode buffer status appropriately when they begin to decode the stream. However, in practice, the decode buffer level at the splice point will differ randomly and unpredictably from the assumed initial decode buffer level because it will not typically be possible to predict the decode buffer level resulting from decoding of the first data stream.

FIGS. 1A and 1B conceptually illustrate a decode buffer level 100 as a function of time for an embodiment in which two data streams are spliced together. In the illustrated embodiment, the decode buffer level increases upward and time increases from left to right. A buffer underflow occurs when the decode buffer level 100 drops below the minimum buffer threshold 105 and a buffer overflow occurs when the decode buffer level 100 rises above the maximum buffer threshold 110. The splice point between the first and second data streams is indicated by the line 115. The bit rate for the first data stream is determined based upon a first model of the decode buffer and the fullness of the decode buffer, which is determined by the relative rate at which information arrives at buffer and is subsequently played out. Accordingly, the decode buffer does not underflow or overflow prior to the splice point 115.

In FIG. 1A, the splice point 115 occurs when the decode buffer level 100 is lower than the initial decode buffer level assumed by a second model that was used to encode the second data stream. The bit rate used to encode the second data stream is determined based upon the second model and the size (or fullness) of the decode buffer. However, since the assumed initial decode buffer level is higher than the actual initial decode buffer level, the encoder bit rate used to encode the second data stream is too low, which results in underflow of the decode buffer at the times 120, 125, 130.

In FIG. 1B, the splice point 115 occurs when the decode buffer level 100 is higher than the initial decode buffer level assumed by the second model that was used to encode the second data stream. The encoder bit rate used to encode the second data stream is therefore too high because the assumed initial decode buffer level is higher than the actual initial decode buffer level. Adopting the relatively high encoder bit rate results in too much information being transmitted, which causes an overflow of the decode buffer at the times 135, 140, 145.

FIG. 2 conceptually illustrates a first embodiment of a timing diagram 200 that illustrates splicing together two data streams. Time increases from the left to the right in FIG. 2. In the illustrated embodiment, the timing diagram 200 depicts compressed frames 205 of encoded digital information and uncompressed frames 210 that are formed from the encoded digital information in the packets 205 and then presented to users. The arrows 215 indicate the association between the compressed frame packets 205 and the uncompressed frames 210 formed using these packets 205. In the interest of clarity, only one packet, frame, and arrow are indicated by numerals 205, 210, 215, respectively. A first encoded data stream 220, such as a multimedia data stream used to present audio and/or video to a user, is provided and may be spliced with a second encoded data stream 225 such as multimedia advertising content that a service provider may want to display to the user during the audio and/or video presentation.

In the illustrated embodiment, a spliced data stream 230 is formed by concatenating the first encoded data stream 220 and the second encoded data stream 225. The concatenation occurs at a splice point 235 defined by the end of the last packet in the first encoded data stream 220. Encoding of the second encoded data stream 225 does not take into account the state of the decoder buffer at the splice point 235. Consequently, the packet 240 arrives too late to be used to form the frame 245, as indicated by the backwards-facing arrow 250. This condition is another representation of an underflow at the decoder buffer, i.e. the decoder buffer has played out all of its contents prior to arrival of the packet 240 and so there is no information available to be decoded and used to form the frame 245. The frame 245 may therefore be a duplicate of a previous frame or an incompletely formed frame.

FIG. 3 conceptually illustrates a second embodiment of a timing diagram 300 that illustrates splicing together two data streams. Time increases from the left to the right in FIG. 3. In the illustrated embodiment, the timing diagram 300 depicts packets 305 of encoded digital information and the frames 310 that are formed from the encoded digital information in the packets 305 and then presented to users. The arrows 315 indicate the association between the packets 305 and the frames 310 formed using these packets 305. In the interest of clarity, only one packet, frame, and arrow are indicated by numerals 305, 310, 315, respectively. A first encoded data stream 320, such as a multimedia data stream used to present audio and/or video to a user, is provided and may be spliced with a second encoded data stream 325 such as multimedia advertising content that a service provider may want to display to the user during the audio and/or video presentation.

In the illustrated embodiment, a spliced data stream 330 is formed by concatenating the first encoded data stream 320 and the second encoded data stream 325. The concatenation occurs at a splice point 335 defined by the end of the last packet in the first encoded data stream 320. Encoding of the second encoded data stream 325 does not take into account the state of the decoder buffer at the splice point 335 and the fullness of the decoder buffer is larger than expected. The packet 340 arrives too early to be used immediately (or within a selected delay time) to form the frame 345, as indicated by the extended arrow 350. This condition is another representation of an overflow at the decoder buffer, i.e. the decoder buffer has to store the information included in the packet 340 for an unexpectedly long time. Subsequently received packets may therefore fill the decoder buffer before the information in the packet 340 can be read out and decoded. Information in the decoder buffer may then be lost as newly received information is rejected or previously received information is popped out of the decoder buffer.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for combining data streams flowing between an encoder and a decoder. The method includes accessing a first encoded data stream. The first encoded data stream is encoded by the encoder based upon a first buffer size associated with the decoder. The method also includes delaying the first encoded data stream by an offset determined based on a second buffer size associated with the decoder. The second buffer size is larger than the first buffer size. The method further includes splicing one or more second encoded data stream(s) into the delayed first encoded data stream.

In another embodiment of the present invention, a method is provided for combining data streams flowing between an encoder and a decoder. The method includes accessing a first encoded data stream that is transmitted at a first transmission rate and accessing at least one second encoded data stream that is transmitted at a second transmission rate. The method also includes increasing the second transmission rate based on a duration of a gap in the first encoded data stream and splicing the second encoded data stream(s) into the gap in the first encoded data stream.

BRIEF DESCRIPTION OF THE DRAWINGS

The invention may be understood by reference to the following description taken in conjunction with the accompanying drawings, in which like reference numerals identify like elements, and in which:

FIGS. 1A and 1B conceptually illustrate a decode buffer level as a function of time for an embodiment in which two data streams are spliced together;

FIGS. 5A, 5B, 5C, and 5D conceptually illustrate timing diagrams indicating timing adjustments that may be used when splicing a secondary data stream into a primary data stream, in accordance with the present invention;

Figure 2:
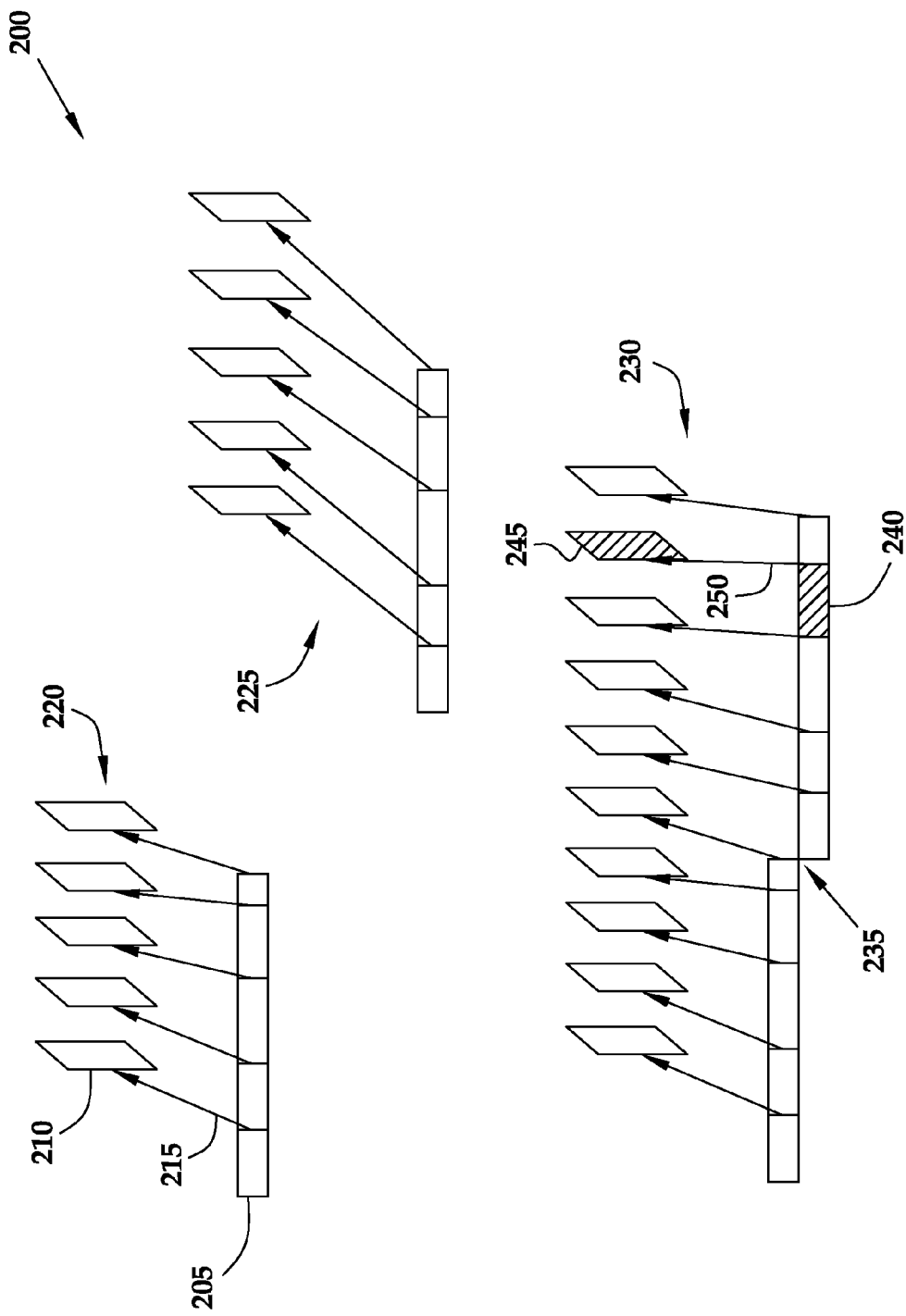
FIG. 2 conceptually illustrates a first embodiment of a timing diagram that illustrates splicing together two data streams.
Figure 3:
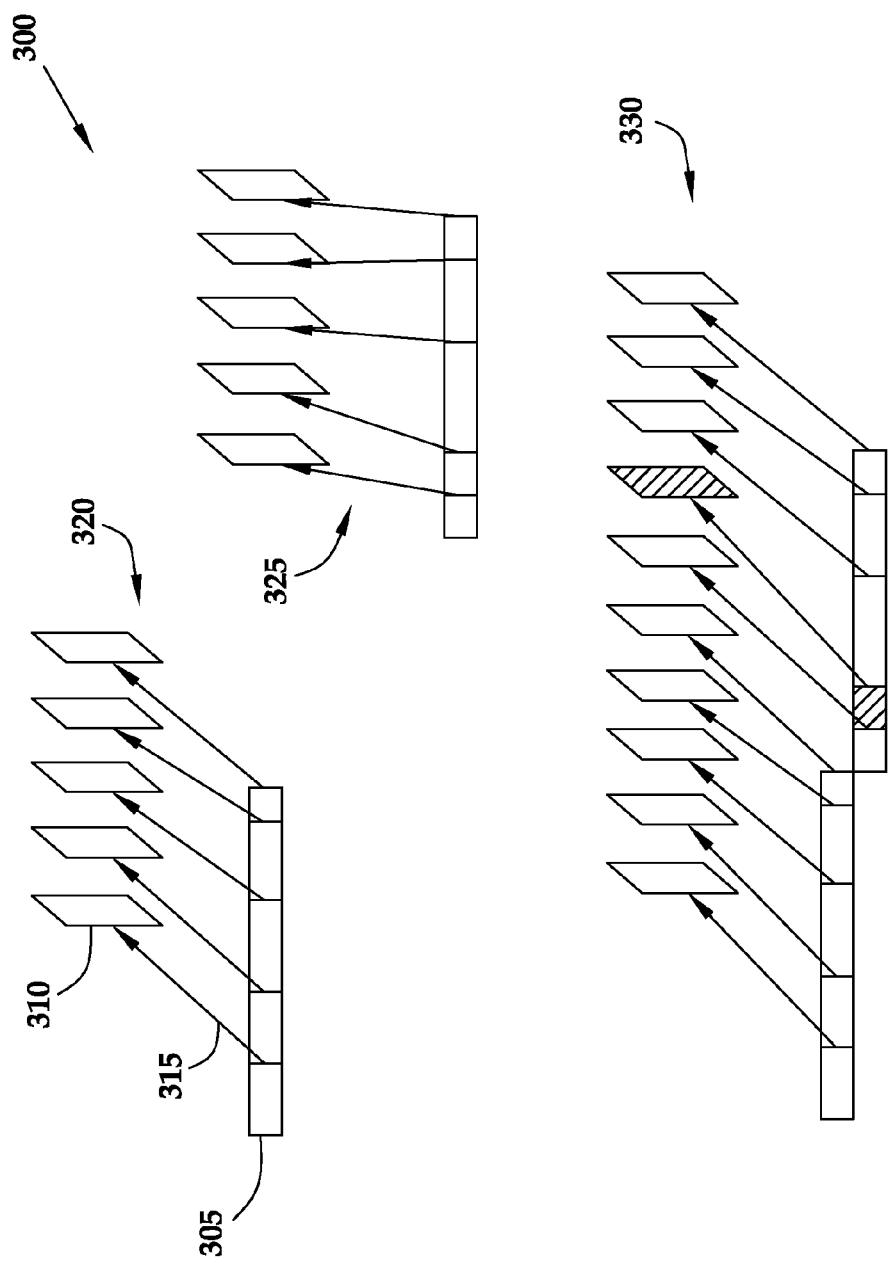
FIG. 3 conceptually illustrates a second embodiment of a timing diagram that illustrates splicing together two data streams.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 4:
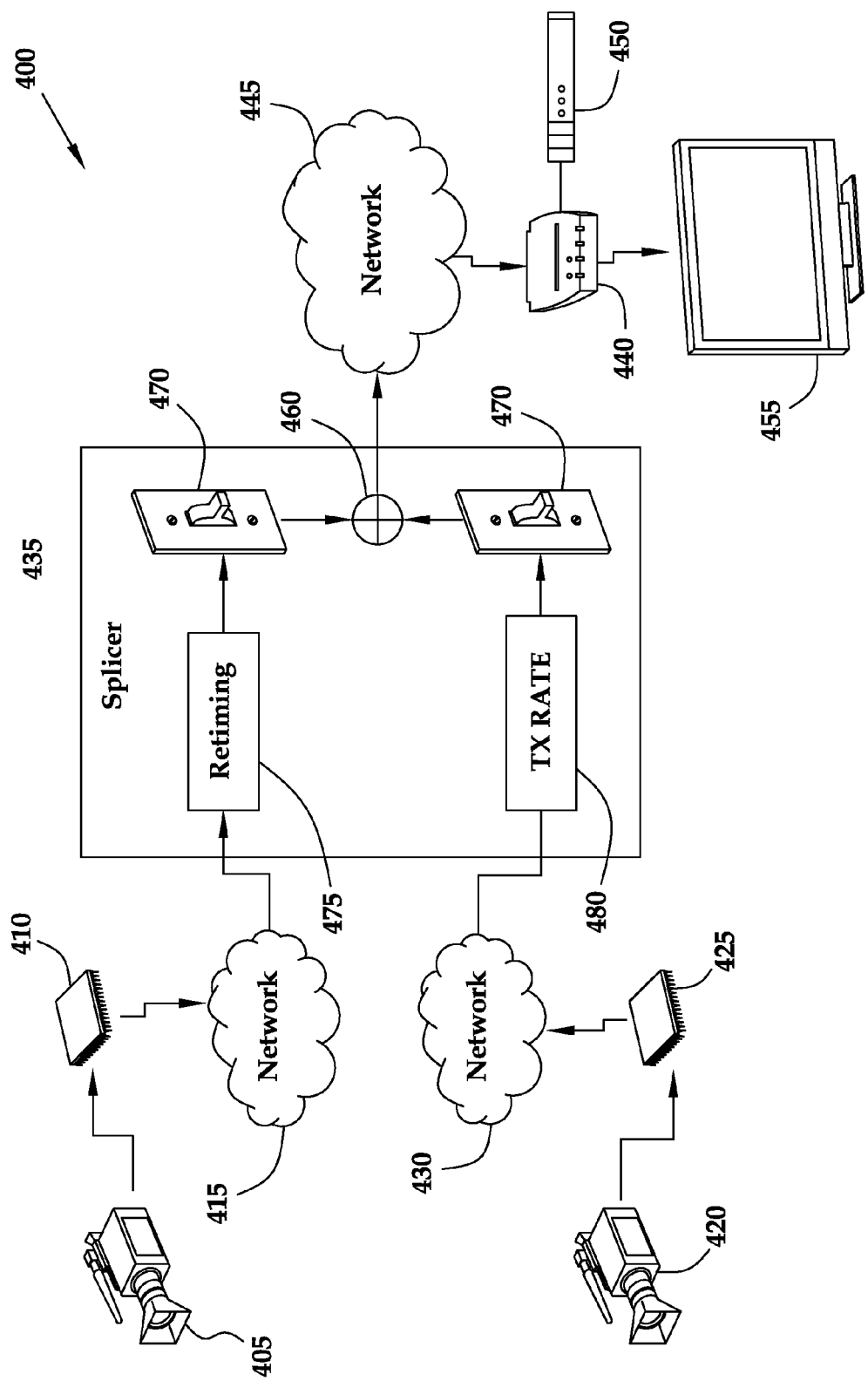
FIG. 4 conceptually illustrates a first exemplary embodiment of a multimedia communication system, in accordance with the present invention.

FIG. 4 conceptually illustrates a first exemplary embodiment of a multimedia communication system 400. In the illustrated embodiment, the multimedia communication system includes a multimedia source device 405 that is used to generate multimedia content and provide the generated content to the multimedia communication system 400. The multimedia source device 405 may be an analog or digital video recording device (as shown in FIG. 4) or any other device capable of generating multimedia content, such as hardware, firmware, and/or software that is used to capture video and/or audio input or to create video and/or audio content, e.g., the device 405 may be a device for creating animations and the associated audio. In the illustrated embodiment, the multimedia content generated by the multimedia source device 405 may be referred to as the primary content and may consist of a movie, a television program, a video-on-demand, and/or other content that may be viewed by a user or subscriber. A digital representation of the multimedia content generated by the multimedia source device 405 may be provided to an encoder 410, which may encode the digital representation for eventual transmission over a network 415 at a selected transmission or data rate.

One or more additional multimedia source devices 420 may also provide multimedia content for transmission to a user. For example, the multimedia source device 420 may be used to generate and provide secondary multimedia content such as multimedia advertising content for insertion into the primary content generated by the multimedia source device 405. However, persons of ordinary skill in the art having benefit of the present disclosure should appreciate that the present invention is not limited to splicing advertising content into movies requested by a user. In alternative embodiments, the techniques described herein may be used to insert, splice, interlace, or otherwise combine any number of independent multimedia data streams. A digital representation of the multimedia content generated by the multimedia source device 420 may be provided to one or more encoders 425, which may encode the digital representation for eventual transmission over a network 430 at a selected transmission or data rate.

The multimedia communication system 400 includes a splicer 435 that may be used to combine the encoded multimedia data streams provided by the encoders 410, 425. For example, service providers may define one or more splice points within the primary content provided by the encoder 410 and the splicer 435 may insert portions of the encoded multimedia content provided by the encoder 425 into the primary content at the splice points. For example, a gap may be formed in the primary content and portions of the multimedia content provided by the encoder 425 may be spliced into the gap. The spliced data stream including the encoded primary content and the encoded secondary content may then be provided to a decoder 440 via a network 445. The decoder 440 may store the provided spliced data stream in a decoder buffer 450 before reading out the data and using it to provide image data to a display device 455.

The encoders 410, 425 use models of the decoder buffer 450 to decide how to encode the data stream, e.g., to select the bit rate that is used to encode the data streams received from the multimedia source devices 405, 420. For example, the encoders 410, 425 may encode the data stream based upon an assumed size of the decoder buffer 450 and estimates of the fullness of the decoder buffer 450. Techniques for modeling and/or encoding data streams provided to decoder buffers are known in the art and in the interest of clarity only those aspects of modeling and/or encoding the data streams that are relevant to the present invention will be discussed herein. In one embodiment in accordance with the present invention, the encoder 410 may encode the primary data stream based upon an assumed size of the decoder buffer 450 that differs from the actual size of the decoder buffer 450. For example, the encoder 410 may be configured to assume that the size of the decoder buffer 450 is one-third of the actual size of the decoder buffer 450. Assuming a reduced size of the decoder buffer 450 may give the multimedia communication system 400 the freedom to adjust the timing of the encoded data stream.

In the illustrated embodiment, the splicer 435 includes a combining element 460 that is coupled to switches 470 that are used to switch between the primary and secondary data streams. The splicer 435 also includes a re-timing element 475 that is used to adjust the timing of the primary data stream received from the encoder 410. In one embodiment, the retiming element 475 is used to delay the primary encoded data stream by an offset that can be selected based upon the assumed and/or actual size of the decoder buffer 450. For example, the retiming element 475 may delay the primary encoded data stream so that the range of delays in the primary encoded data stream are distributed around a midpoint of the range of delays supported by the actual size of the decoder buffer 450. Although the retiming element 475 is shown in the splicer 435 in the illustrated embodiment, persons of ordinary skill in the art having benefit of the present disclosure should appreciate that the present invention is not limited to implementing the retiming element 475 in this location. In alternative embodiments, the retiming element 475 may be implemented in other locations such as the encoder 410, the network 415, or as a stand-alone element along the path of the data stream.

Adjusting the timing of the primary encoded data stream may reduce the likelihood of underflow and/or overflow of the decoder buffer 450 when the secondary data stream is spliced into the primary data stream. The second data stream may also be modified to reduce the likelihood of underflow and/or overflow of the decoder buffer 450. In the illustrated embodiment, the splicer 435 includes a transmission rate element 480 that can be used to modify the transmission or data rate of the data stream provided by the network 430. For example, the transmission rate may be increased by an amount determined by one or more gaps in the data stream provided by the network 415 so that the secondary data stream can be spliced into the gap. In one embodiment, the encoder 425 may encode the secondary data stream at a bit rate that is lower than the bit rate used to encode the primary data stream. The new encoding rate may be used to compensate for the change in the transmission rate introduced by the transmission rate element 480. A timing reference for the secondary data stream may also be adjusted to allow the secondary data stream to be spliced into the primary data stream. Adjusting the transmission rate, the bit rate, and/or the timing reference of the secondary encoded data stream may reduce the likelihood of underflow and/or overflow of the decoder buffer 450 when the secondary data stream ends and the splicer 435 switches back to the primary data stream.

FIGS. 5A, 5B, 5C, and 5D conceptually illustrate timing diagrams 500, 505, 510, 515 indicating timing adjustments that may be used when splicing a secondary data stream into a primary data stream. Time increases from the left to the right in FIGS. 5A-5D. In the illustrated embodiment, the timing diagrams 500, 505, 510, 515 depict packets 520 of encoded digital information and frames 525 that are formed from the encoded digital information in the packets 520 and then presented to users. The arrows 530 indicate the association between the packets 520 and the frames 525 formed using these packets 520. In the interest of clarity, only one packet, frame, and arrow in each figure are indicated by numerals 520, 525, 530, respectively.

FIG. 5A conceptually illustrates the timing diagram 500 that illustrates simple splicing of a first encoded data stream 535 and a second encoded data stream 540. For example, the first encoded data stream may be a multimedia data stream used to present audio and/or video to a user and the second encoded data stream 540 may include multimedia advertising content that a service provider may want to display to the user during the audio and/or video presentation. In the illustrated embodiment, the first encoded data stream 535 and the second encoded data stream 540 overlap in the region 545 at least in part because of the different models used to encode the data streams. Although FIG. 5A depicts the second data stream 540 as beginning before the end of the first data stream 535, persons of ordinary skill in the art having benefit of the present disclosure should appreciate that the actual overlap may be random and/or unpredictable. In one embodiment in accordance with the present invention, the first encoded data stream 535 may be delayed by a selected interval to reduce overlap with the second encoded data stream 540 and reduce the likelihood that buffer overflow and/or underflow will occur at the splice point.

FIG. 5B conceptually illustrates the timing diagram 505 that illustrates splicing of a delayed first encoded data stream 550 and the second encoded data stream 540. In the illustrated embodiment, the delayed first encoded data stream 550 has been delayed by a selected interval to reduce overlap at the splice point. In some cases, the delay introduced into the first encoded the data stream 550 may increase the likelihood that the second encoded data stream 540 overlap with the first encoded data stream 550 in a region 555 around the time at which the first delayed encoded data stream 545 resumes. This overlap may result in overflow and/or underflow of the decoder buffer when the first delayed encoded data stream 545 resumes transmission from the encoder to the decoder. The encoding bit rate for the second encoded data stream 540 may therefore be reduced. For example, the encoding rate for the second encoded data stream 540 may be reduced relative to the encoding rate (referred to herein as the network rate) used for the first encoded data stream 540 according to the expression:

$$EncodeRate = NetworkRate - \frac{2N * NetworkRate}{D} = NetworkRate * \left(1 - \frac{2N}{D}\right).$$

In this expression, N is the number of seconds assumed by the encoder for the decoder delay and D is the duration of the spliced multimedia content. In one embodiment, the encoder rate used for the second encoded data stream 540 is approximately 90% of the network rate.

Figure 5C:
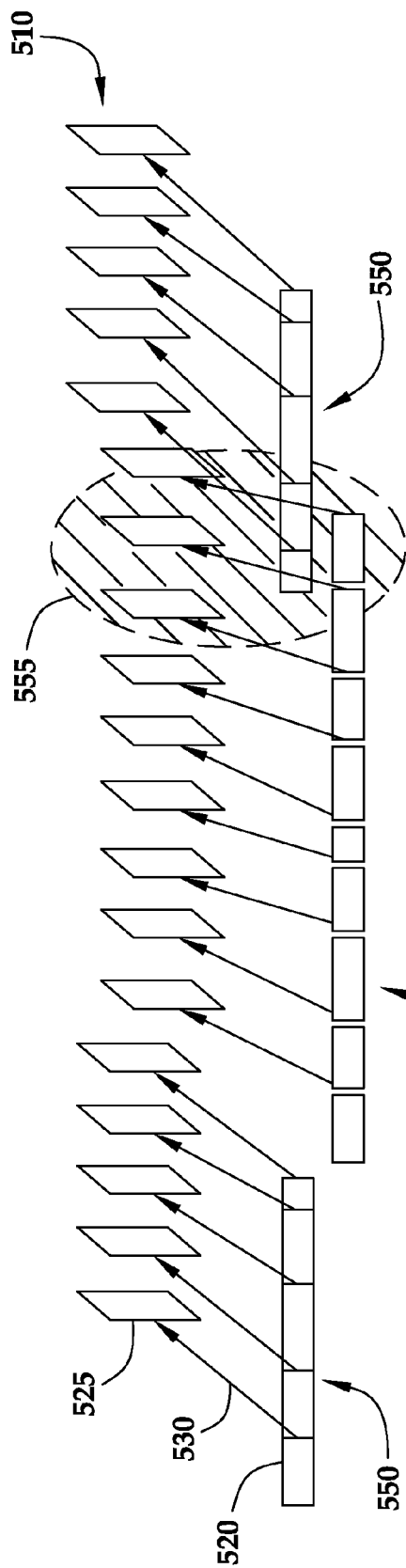

FIG. 5C conceptually illustrates the timing diagram 510 that illustrates splicing of a delayed first encoded data stream 550 and a second encoded data stream 560 that has been encoded at a lower encoding rate. Encoding the second data stream 560 at a lower rate may reduce the size of the individual compressed frames in the encoded data stream 560, which may introduce timing gaps between the packets. However, portions of some of these packets may still overlap with the first encoded data stream 550 in the region 555 around the time at which the first delayed encoded data stream 545 resumes. This overlap may result in overflow and/or underflow of the decoder buffer when the first delayed encoded data stream 545 resumes transmission from the encoder to the decoder. The second encoded data stream 560 may therefore be adjusted by transmitting this data stream at a faster rate so that the second encoded data stream 560 "fits" into the gap in the first delayed encoded data stream 545. In one embodiment, a timing reference that is embedded in the second data stream may also be modified based the modifications to the transmission rate and/or the encoding rate. For example, the program clock reference that is used to transmit the compressed data in the second encoded data stream 560 may be modified, e.g., to reduce the time between the packets in the second encoded data stream 560. Adjustment or modification of the transmission rate, the encoding rate, and/or the timing reference may be performed statically or dynamically, e.g., based upon feedback indicating changing conditions in the system.

Figure 5D:
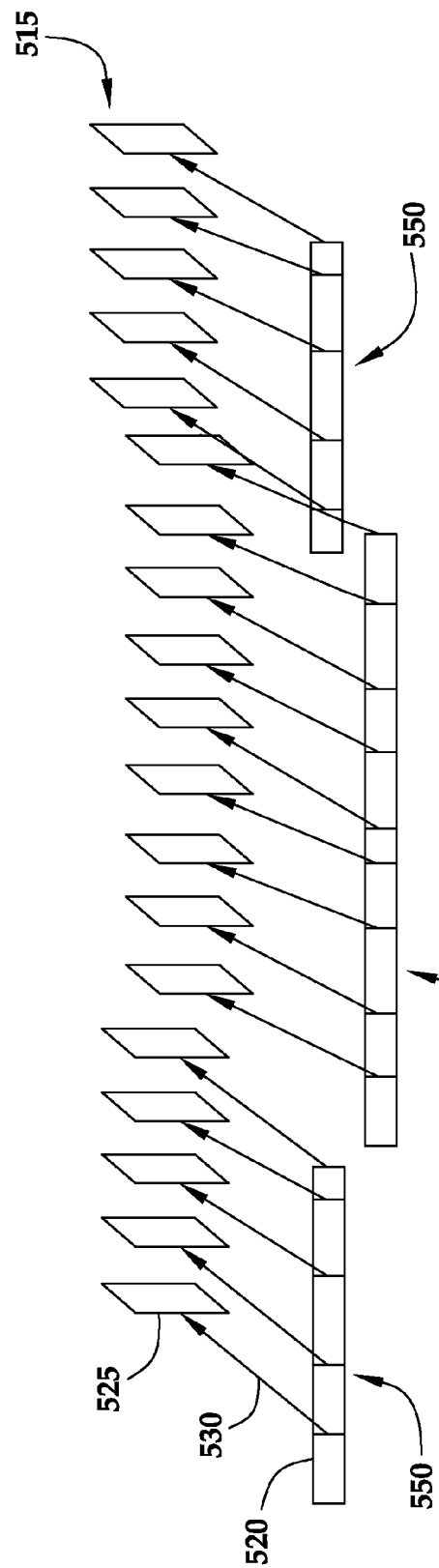

FIG. 5D conceptually illustrates the timing diagram 515 that illustrates splicing of the delayed first encoded data stream 550 and the second encoded data stream 565 that has been encoded at a lower encoding rate using a modified timing reference and faster transmission rate. In the illustrated embodiment, the modifications to the second encoded data stream 565 insure that it fits completely with the gap in the delayed first encoded data stream 550. Consequently, the delayed first encoded data stream 550 and the second encoded data stream 565 do not overlap at either the splice point or the point at which the delayed first encoded data stream 550 resumes transmission. Consequently, the likelihood of underflow and/or overflow of the decoder buffer may be reduced or eliminated by delaying the first encoded data stream 550 and/or using a lower encoding rate and a different timing reference for the second encoded data stream 565.

FIGS. 6A, 6B, 6C, and 6D conceptually illustrate decoder delay diagrams 600, 605, 610, 615 indicating delays that may be used when splicing a secondary data stream into a primary data stream. In the decoder delay diagrams 600, 605, 610, 615 time increases from left to right and the delay associated with transmission at that time increases from the bottom to the top of the diagrams. The hatched area of the diagram indicates the delay supported by the size of the actual buffer in the associated decoder, which in this case is set to be 3 N seconds. The value of N is a matter of design choice. However, one typical value of N that may be used is a value of N=1 second so that the delay supported by the actual decoder buffer is three seconds. Persons of ordinary skill in the art having benefit of the present disclosure should appreciate that the size of the buffer determines the associated delay that can be supported by the buffer. Increasing the size of the buffer will increase the size of the delay supported by the buffer and decreasing the size of the buffer will decrease the size of the delay supported by the buffer.

Figure 6A:
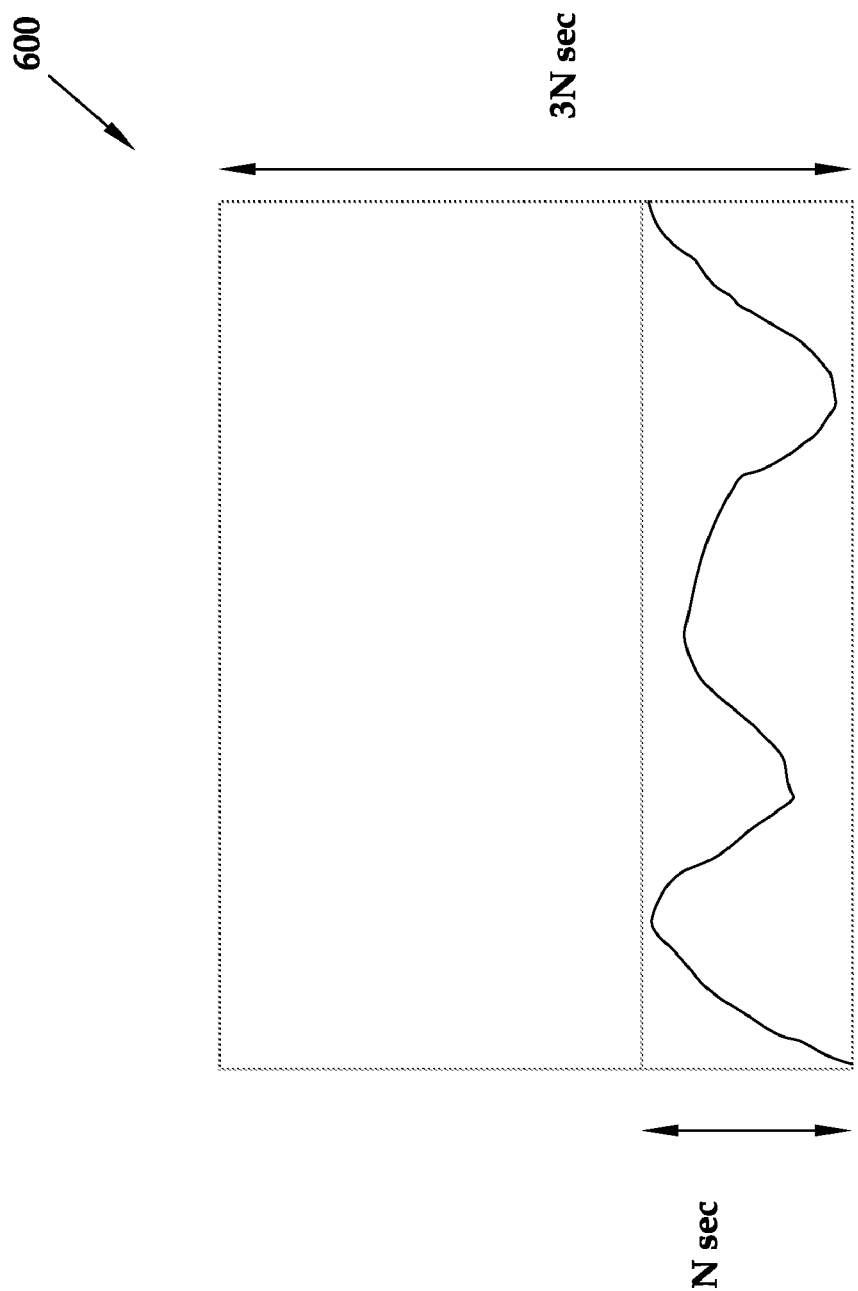
FIGS. 6A, 6B, 6C, and 6D conceptually illustrate decoder delay diagrams indicating delays that may be used when splicing a secondary data stream into a primary data stream, in accordance with the present invention.

FIG. 6A shows a decoder delay diagram 600 that depicts a delay 620 used by an encoder as a function of time. The delay

620 corresponds to the bit rate used by the encoder to encode a first data stream, which is adjusted based upon the assumed size of the decoder buffer. In the illustrated embodiment, the decoder buffer is assumed to have a size that supports a maximum delay of N seconds and so the delay 620 associated with the encoded first data stream remains less than N seconds. As discussed herein, the likelihood of underflow and/or overflow of the decoder buffer caused by splicing a second data stream into the first data stream can be reduced or eliminated by delaying the first data stream.

Figure 6B:
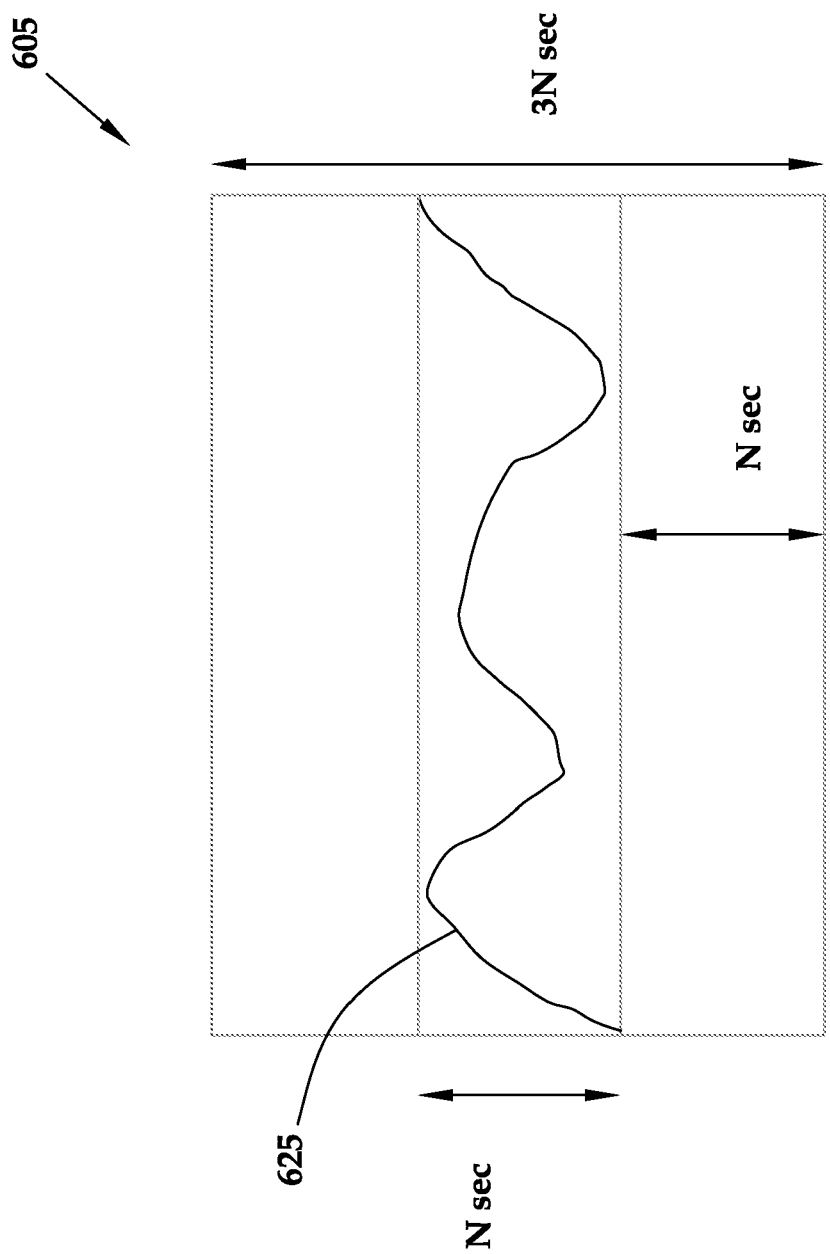

FIG. 6B shows a decoder delay diagram 605 that depicts the encoded first data stream delay 625 after the first data stream has been delayed by an additional N seconds. Implementing the additional delay shifts the delays 625 associated with the first data stream such that the midpoint of the range of delays 625 associated with the first data stream approximately corresponds to the midpoint of the range of delays supported by the actual size of the buffer, which in this case is 3 N seconds. The buffer occupancy increases when the delay increases because the received information is stored for a longer time to accommodate the increase in the delay.

Figure 6C:
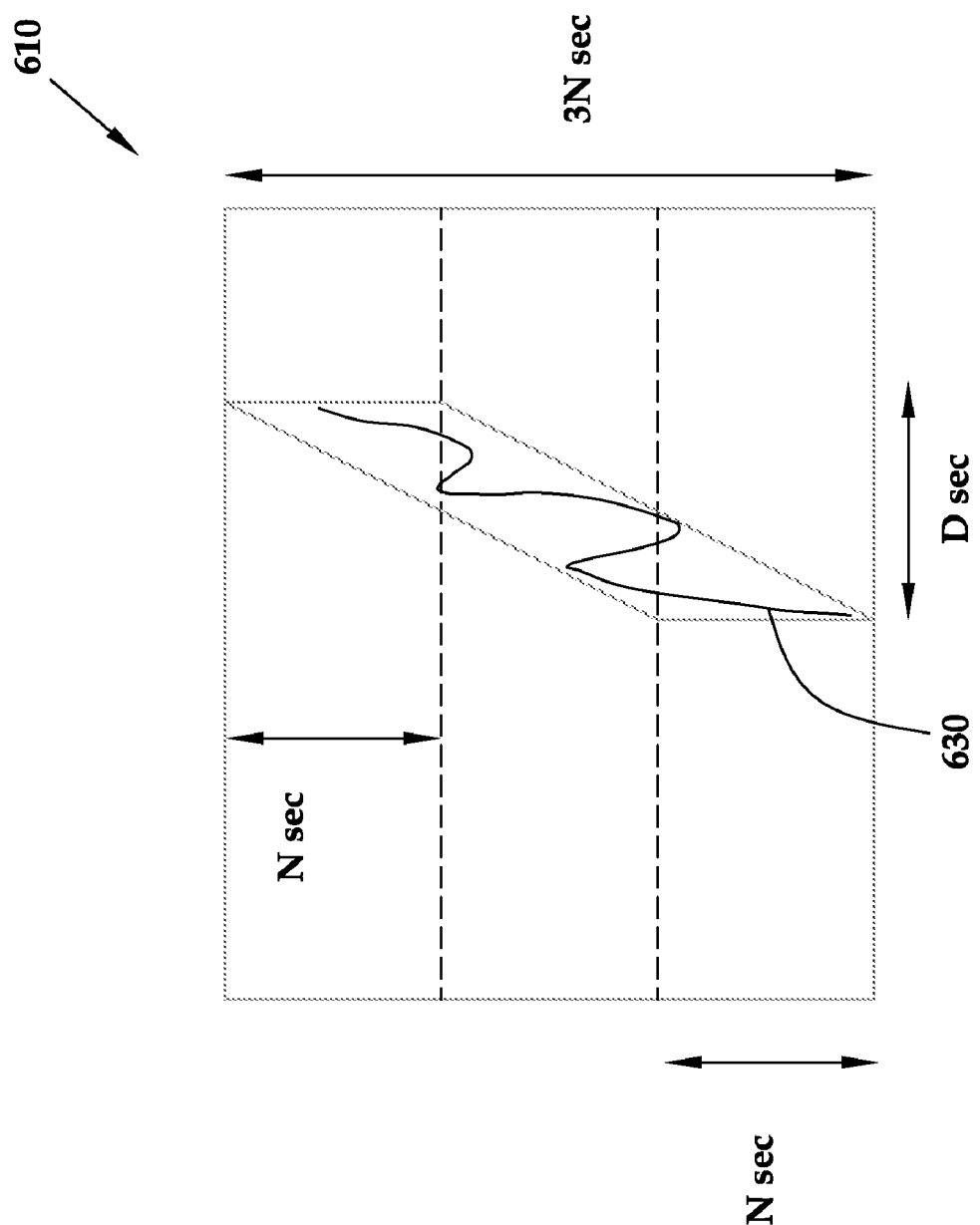

FIG. 6C shows a decoder delay diagram 610 that depicts a delay 630 of an encoded second data stream that is intended to be spliced into the encoded first data stream. The encoder for the second data stream uses the actual size of the decoder buffer to determine delays and/or corresponding bit rates that are used to encode the second data stream. The duration of the second data stream that is intended to be spliced into the first data stream is D seconds, where D is a value that can be selected based on the information that is expected to be spliced into the first data stream. For example, a 30-second-long commercial may be inserted in the first data stream, in which case the value of D=30. In the illustrated embodiment, the transmission rate of the second data stream is increased (as discussed herein), which causes the buffer occupancy to increase over the duration of the gap allocated to the spliced second data stream. The selected modification to the transmission rate may therefore take the buffer size into account. In one embodiment, the second data stream may be encoded at an encoding rate that is slightly smaller than the network rate. The timing of the second encoded data stream may then be adjusted by adjusting the timing reference and/or transmission rate used for the second encoded data stream, as discussed herein.

Figure 6D:
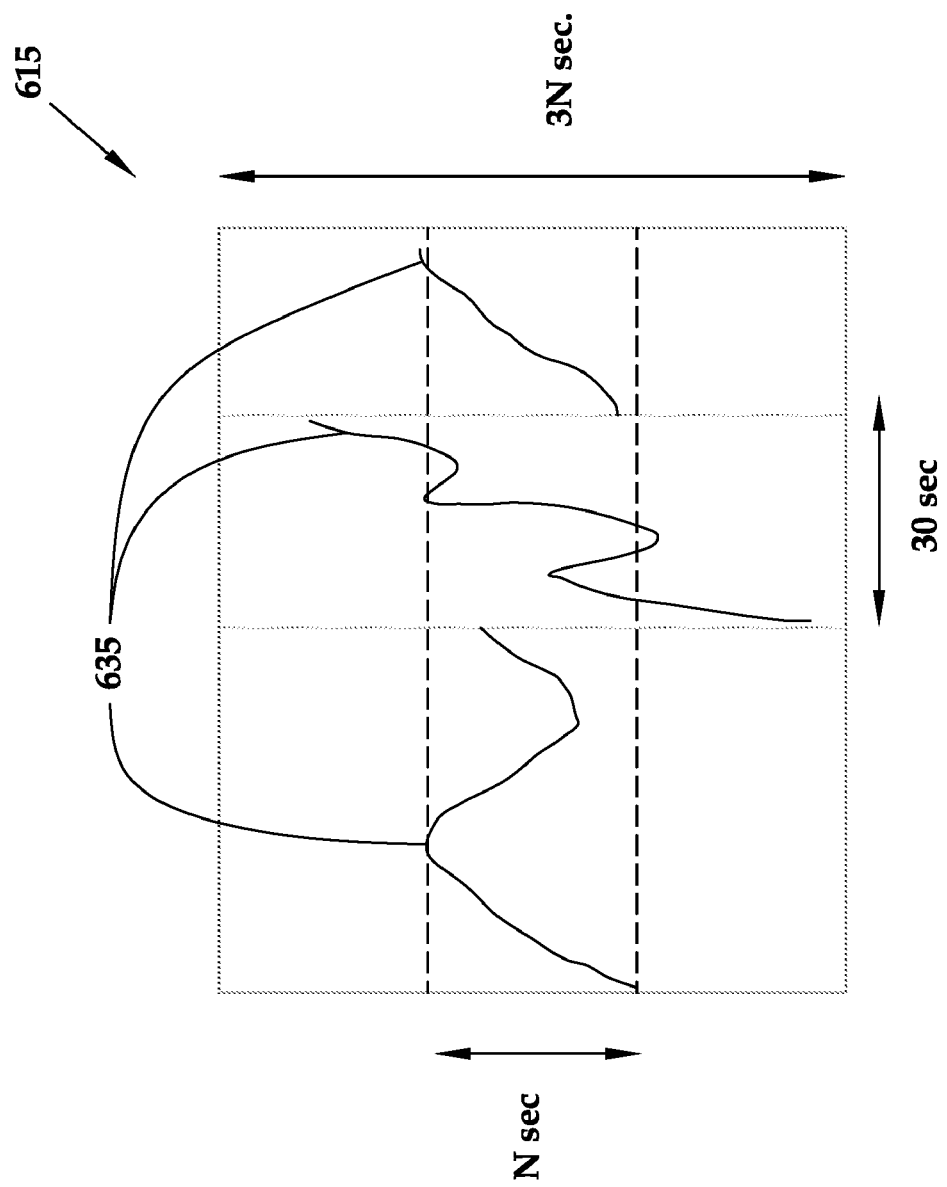

FIG. 6D shows a decoder delay diagram 615 that depicts a delay 635 of a data stream including the first encoded data stream and the spliced-in second encoded data stream. In the illustrated embodiment, modifying the timing of the first encoded data stream and, in some cases, the second encoded data stream, allows the second encoded data stream to be spliced into the first encoded data stream without causing underflow and/or overflow of the decoder buffer.

Figure 7:
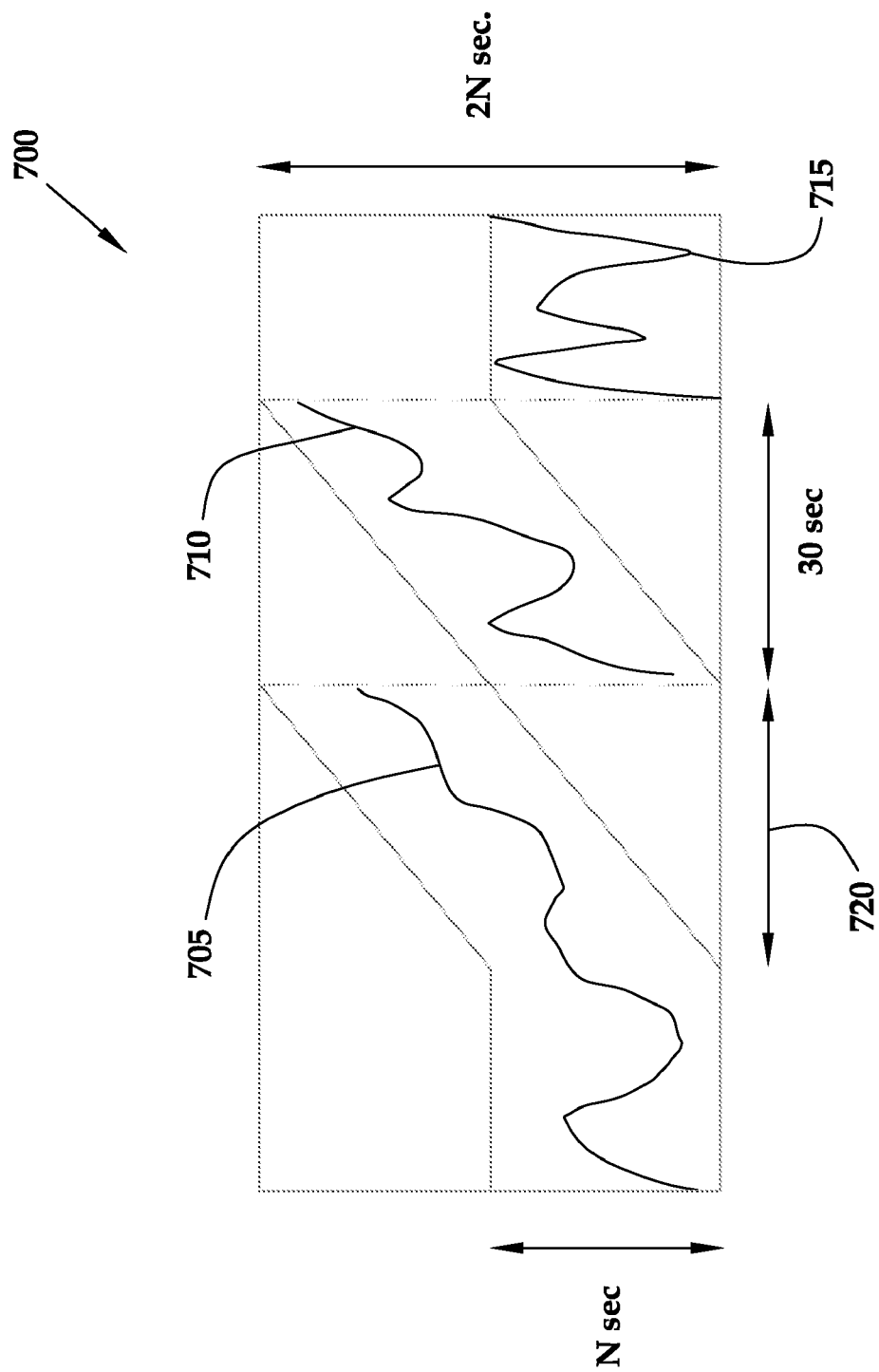
FIG. 7 conceptually illustrate a decoder delay diagram indicating delays that may be used when splicing a secondary data stream into a primary data stream, in accordance with the present invention.

FIG. 7 conceptually illustrate a decoder delay diagram 700 indicating delays 705 that may be used when splicing a secondary data stream into a primary data stream. In the illustrated embodiment, the decoder buffer supports delays of up to 2*N seconds and the delay associated with the primary data stream is set between 0-N seconds until the splice point approaches. For example, the delay associated with the primary data stream may remain in the range 0-N seconds until an interval 720 prior to the splice point. In one embodiment, the duration of the interval 720 may be selected based upon considerations of latency, channel change times, and the like.

During the interval 720, the delay 705 associated with the primary encoded data stream may be increased into the approximate range 1*N-2*N seconds so that the possible range of the delays 705 associated with the primary encoded data stream at the end of the interval 720 approximately corresponds to the upper half of the delays supported by the decoder buffer. The delay 710 associated with the encoded secondary data stream may be adjusted using the techniques described herein, such as encoding the secondary data stream at a lower encoding rate and then adjusting the transmission rate, the timing reference, and/or the encoding rate. The secondary encoded data stream may then be spliced into the primary encoded data stream. Once the secondary encoded data stream has finished transmission, then transmission of the primary encoded data stream may resume. In the illustrated embodiment, the delay 715 associated with the primary data stream is set between 0-N seconds following the spliced secondary encoded data stream.

Figure 8:
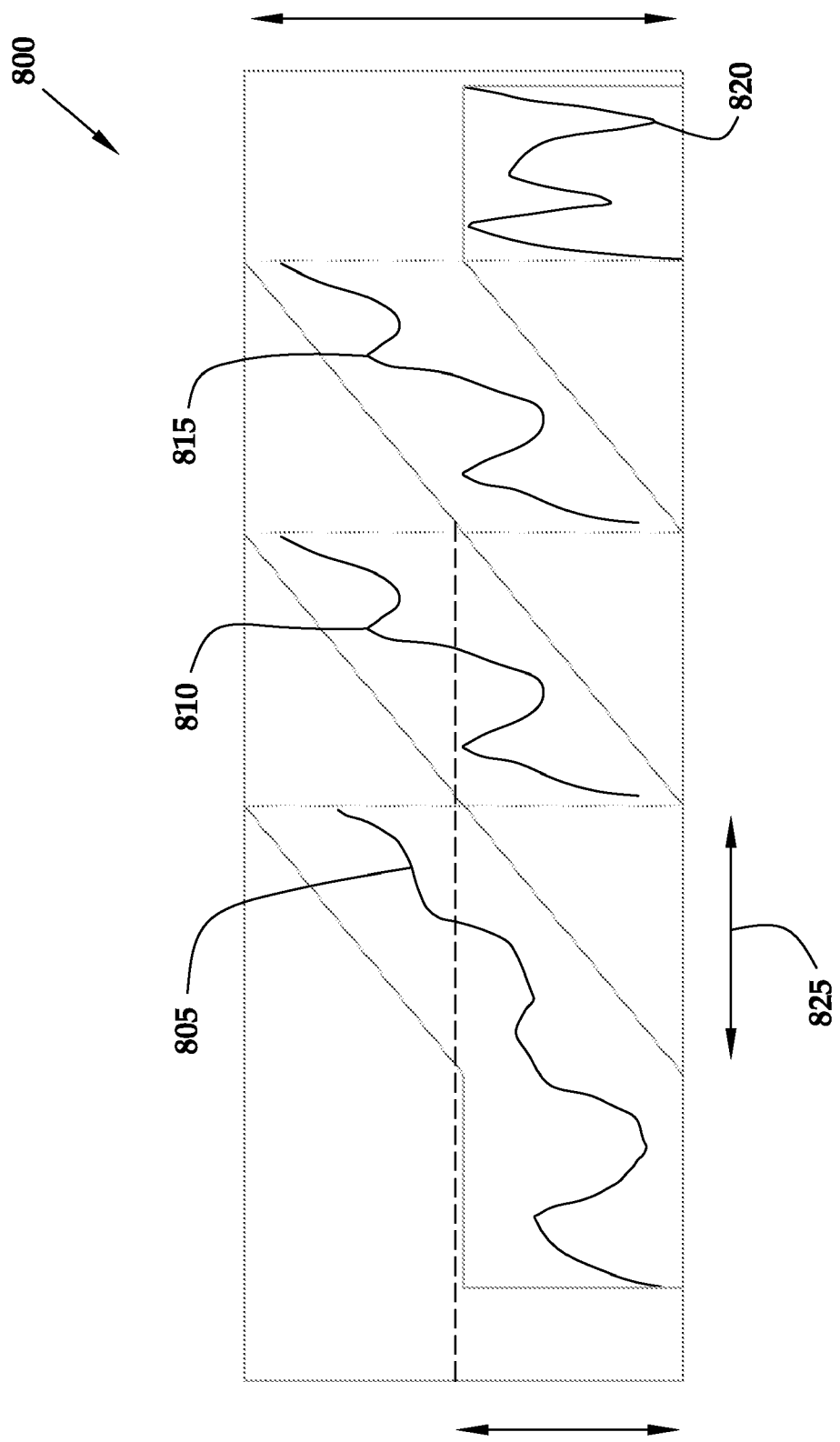
FIG. 8 conceptually illustrate a decoder delay diagram indicating delays that may be used when splicing a plurality of secondary data streams into a primary data stream, in accordance with the present invention.

FIG. 8 conceptually illustrates a decoder delay diagram indicating delays 805, 810, 815, 820 that may be used when splicing a plurality of secondary data streams into a primary data stream. In the illustrated embodiment, the delay 805 associated with the primary data stream is set between 0-N seconds until an interval 825 prior to the splice point. During the interval 825, the delay 805 associated with the primary encoded data stream may be increased into the range 1*N-2*N seconds. Secondary data streams can then be spliced in to the primary data stream and the secondary data streams may be encoded using delays 810, 815. Following transmission of the secondary data streams, transmission of the primary encoded data stream may resume. In the illustrated embodiment, the delay 820 associated with the primary data stream is set between 0-N seconds following the spliced secondary encoded data streams.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. A method of combining data streams flowing between an encoder and a decoder, comprising:
   accessing a first encoded data stream that is encoded at a first encoding rate by the encoder based upon a first buffer size associated with the decoder;
   delaying the first encoded data stream by an offset determined based on a second buffer size associated with the decoder;
   encoding at least one second data stream at a second encoding rate to form at least one second encoded data stream, wherein the second encoding rate is lower than the first encoding rate, thereby introducing timing gaps between packets in said second encoded data stream; and
   splicing said at least one second encoded data stream into a gap in the delayed first encoded data stream.

2. The method of claim 1, wherein accessing the first encoded data stream comprises accessing a first encoded data stream that is encoded based upon an assumed size of a buffer in the decoder that receives the first encoded data stream.

3. The method of claim 2, wherein delaying the first encoded data stream comprises delaying the first encoded data stream by an offset determined based upon an actual size of the buffer in the decoder that receives the first encoded data stream, the offset shifting a midpoint of a first range of delays determined by the assumed size of the buffer in the decoder to correspond to a midpoint of a second range of delays determined by the actual size of the buffer.

4. The method of claim 1, comprising modifying a timing reference used by said at least one second encoded data stream to reduce the timing gaps between the packets of said at least one second encoded data stream.

5. The method of claim 1, comprising encoding said at least one second data stream using a second encoding rate determined by a delay that corresponds to the first buffer size and a duration of said at least one second data stream.

6. The method of claim 1, comprising increasing a transmission rate of said at least one second encoded data stream based on a duration of the gap in the first encoded data stream and a duration of said at least one second encoded data stream.

7. The method of claim 1, wherein delaying the first encoded data stream comprises delaying the first encoded data stream during a selected interval prior to splicing the second encoded data stream into the first encoded data stream.

8. The method of claim 1, comprising transmitting the first encoded data stream including the spliced second encoded data stream to the decoder.

9. A method of combining data streams flowing between an encoder and a decoder, comprising:
   accessing a first encoded data stream that is transmitted at a first transmission rate, the first encoded data stream being encoded by the encoder to have a range of delays corresponding to a first buffer size;
   accessing at least one second encoded data stream that is transmitted at a second transmission rate;
   increasing the second transmission rate based on a duration of a gap in the first encoded data stream so that said at least one second encoded data stream has a range of delays that corresponds to a second buffer size that is larger than the first buffer size;
   splicing said at least one second encoded data stream into the gap in the first encoded data stream.

10. The method of claim 9, wherein increasing the second transmission rate comprises increasing the second transmission rate based on a size of a buffer in the decoder.

11. The method of claim 9, further comprising encoding at least one second data stream to form said at least one second encoded data stream, the encoding being performed using an encoding rate determined by a delay that corresponds to the first buffer size and a duration of said at least one second data stream.

12. The method of claim 11, comprising adjusting a timing reference for said at least one second encoded data stream, the timing reference adjustment being selected so that said at least one second encoded data stream can be transmitted at the increased second transmission rate.

13. The method of claim 11, wherein accessing the first encoded data stream comprises accessing a first encoded data stream that is encoded based upon an assumed size of a buffer in the decoder that receives the first encoded data stream.

14. A method of combining data streams flowing between an encoder and a decoder, comprising:
   accessing a first encoded data stream that is transmitted at a first transmission rate, the first encoded data stream being encoded by the encoder to have a range of delays corresponding to a first buffer size, wherein accessing the first encoded data stream comprises accessing a first encoded data stream that is encoded based upon an assumed size of a buffer in the decoder that receives the first encoded data stream;
   encoding at least one second data stream to east one second encoded data stream, the encoding being performed using an encoding rate determined by a delay that corresponds to the first buffer size and a duration of said at least one second data stream
   accessing said at least one second encoded data stream that is transmitted at a second transmission rate;
   increasing the second transmission rate based on a duration of a gap in the first encoded data stream so that said at least one second encoded data stream has a range of delays that corresponds to a second buffer size that is larger than the first buffer size;
   delaying the first encoded data stream by an offset determined based on the second buffer size; and
   splicing said at least one second coded data stream into the gap in the first encoded data stream.

15. The method of claim 14, wherein delaying the first encoded data stream comprises delaying the first encoded data stream by an offset determined based upon an actual size of the buffer in the decoder that receives the first encoded data stream, the offset shifting a midpoint of a range of delays in the first encoded data stream so that the midpoint is centered on a range of delays corresponding to the actual size of the buffer.

16. The method of claim 14, wherein delaying the first encoded data stream comprises delaying the first encoded data stream during a selected interval prior to splicing the second encoded data stream into the first encoded data stream.

17. A method of combining data streams flowing between an encoder and a decoder, comprising:
- accessing a first encoded data stream that is transmitted at a first transmission rate, wherein accessing the first encoded data stream comprises accessing a first encoded data stream that is encoded at a first data rate by the encoder based upon a first buffer size associated with the decoder;
- encoding at least one second data stream to form said at least one second encoded data stream, the encoding being performed using a second data rate selected based on the increased second transmission rate, the second data rate that being lower than the first data rate;
- delaying the first encoded data stream by an offset determined based on a second buffer size associated with the decoder, the second buffer size being larger than the first buffer size;
- accessing said at least one second encoded data stream that is transmitted at a second transmission rate;
- increasing the second transmission rate based on a duration of a gap in the first encoded data stream; and
- splicing said at least one second encoded data stream into the gap in the first encoded data stream, wherein delaying the first encoded data stream comprises delaying the first encoded data stream during a selected interval prior to splicing the second encoded data stream into the first encoded data stream, and wherein delaying the first encoded data stream during the selected interval comprises selecting the interval based on a channel change time.

18. The method of claim 9, comprising transmitting the data stream including the first encoded data stream and the spliced second encoded data stream to the decoder.

19. A splicer configured to receive input encoded data streams from encoders and to provide at least one output encoded data stream to a decoder, the splicer being configured to:
- access a first input encoded data stream, the first encoded data stream being encoded at a first encoding rate by the encoder based upon a first buffer size associated with the decoder;
- delay the first input encoded data stream by an offset determined based on a second buffer size associated with the decoder;
- encode at least one second data stream at a second encoding rate to form at least one second encoded data stream, wherein the second encoding rate is lower than the first encoding rate, thereby introducing timing gaps between packets in said second encoded data stream; and
- splice said at least one second input encoded data stream into a gap in the delayed first encoded data stream.

20. A splicer configured to receive input encoded data streams from encoders and to provide at least one output encoded data stream to a decoder, the splicer being configured to:
- access a first input encoded data stream that is transmitted at a first transmission rate, the first input encoded data stream being encoded to have a range of delays corresponding to a first buffer size associated with the decoder;
- access at least one second input encoded data stream that is transmitted at a second transmission rate;
- increase the second transmission rate based on a duration of a gap in the first input encoded data stream so that said at least one second input encoded data stream has a range of delays that corresponds to a second buffer size that is larger than the first buffer size; and
- splice said at least one second input encoded data stream into the gap in the first input encoded data stream to form said at least one output encoded data stream.

* * * * *